United States Patent [19]
Klugman et al.

[11] 3,874,858
[45] Apr. 1, 1975

[54] METHOD AND APPARATUS FOR ELECTROSTATIC REMOVAL OF PARTICULATE FROM A GAS STREAM

[75] Inventors: Warren L. Klugman, Berea; Jerome Kosmider, Strongsville, both of Ohio

[73] Assignee: The Ceilcote Company, Berea, Ohio

[22] Filed: July 11, 1973

[21] Appl. No.: 378,278

Related U.S. Application Data

[63] Continuation of Ser. No. 165,209, July 22, 1971, abandoned.

[52] U.S. Cl. ........................ 55/118, 55/10, 55/122, 55/124, 55/131, 55/233, 55/258, 261/98, 261/117

[51] Int. Cl. ............................................. B03c 3/78
[58] Field of Search .............. 55/5, 10, 11, 13, 107, 55/108, 117, 118, 119, 120, 122, 124, 131, 134, 135, 136, 137, 138, 233, 258; 261/94, 98, 112, 117

[56] References Cited
UNITED STATES PATENTS

| | | | |
|---|---|---|---|
| 1,358,031 | 11/1920 | Smith | 55/138 X |
| 1,358,032 | 11/1920 | Smith | 55/138 X |
| 1,381,660 | 6/1921 | Rathbun | 55/138 X |
| 1,472,231 | 10/1923 | Schmidt | 55/129 |
| 1,508,331 | 9/1924 | Huber | 55/13 |
| 1,843,839 | 2/1932 | Ruder | 55/127 |
| 2,249,801 | 7/1941 | White | 55/119 X |
| 2,357,354 | 9/1944 | Penney | 55/138 X |
| 2,448,046 | 8/1948 | Penney et al. | 55/118 |
| 2,634,818 | 4/1953 | Wintermute | 55/136 X |
| 3,064,409 | 11/1962 | Schmitt | 55/122 |
| 3,151,187 | 9/1964 | Comte | 261/98 X |
| 3,212,856 | 10/1965 | Smith | 55/151 |
| 3,324,630 | 6/1967 | Teller et al. | 55/90 |
| 3,615,199 | 10/1971 | Terrana et al. | 23/178 |

FOREIGN PATENTS OR APPLICATIONS

| | | | |
|---|---|---|---|
| 418,551 | 10/1934 | United Kingdom | 55/118 |

OTHER PUBLICATIONS

Hughson, Roy V., "Controlling Air Pollution," Chemical Engineering, August 29, 1966, pp. 71–90.
Thibodeaux, L. J., "Continuous Crosscurrent Mass Transfer in Towers," Chemical Engineering, June 2, 1969, pp. 165–170.

*Primary Examiner*—Bernard Nozick
*Attorney, Agent, or Firm*—Meyer, Tilberry & Body

[57] ABSTRACT

A method and apparatus is disclosed for removing particulate matter from a gas stream. The apparatus includes a packed wet scrubber through which a scrubbing liquid such as water is flowed vertically downwardly and through which gas to be cleaned is flowed in a direction transverse to the direction of flow of the scrubbing liquid. The packing material is disposed in a chamber and the packing material and scrubbing liquid are maintained electrically neutral. A stream of gas to be treated is ionized prior to its flow through the wet scrubber to provide particles in the gas stream with an electrical charge of a given polarity, usually negative. Upon flow of the gas stream through the wet scrubber, the charged particles in the gas stream are carried into close proximity with and are attracted to the scrubbing liquid and/or packing elements as a result of attraction forces between the charged particles and the electrically neutral packing elements and liquid. Thus, the charged particles are removed from the gas stream and are carried from the scrubber to a discharge point by the scrubbing liquid. The particle laden gas is flowed through the wet scrubber apparatus at a velocity which is sufficiently low to provide for the attraction forces to overcome the velocity of a particle in the gas stream and the drag force of the gas stream on the particle so that the particle is removed from the gas stream as opposed to remaining entrained therein and flowing through the apparatus.

3 Claims, 6 Drawing Figures

3,874,858
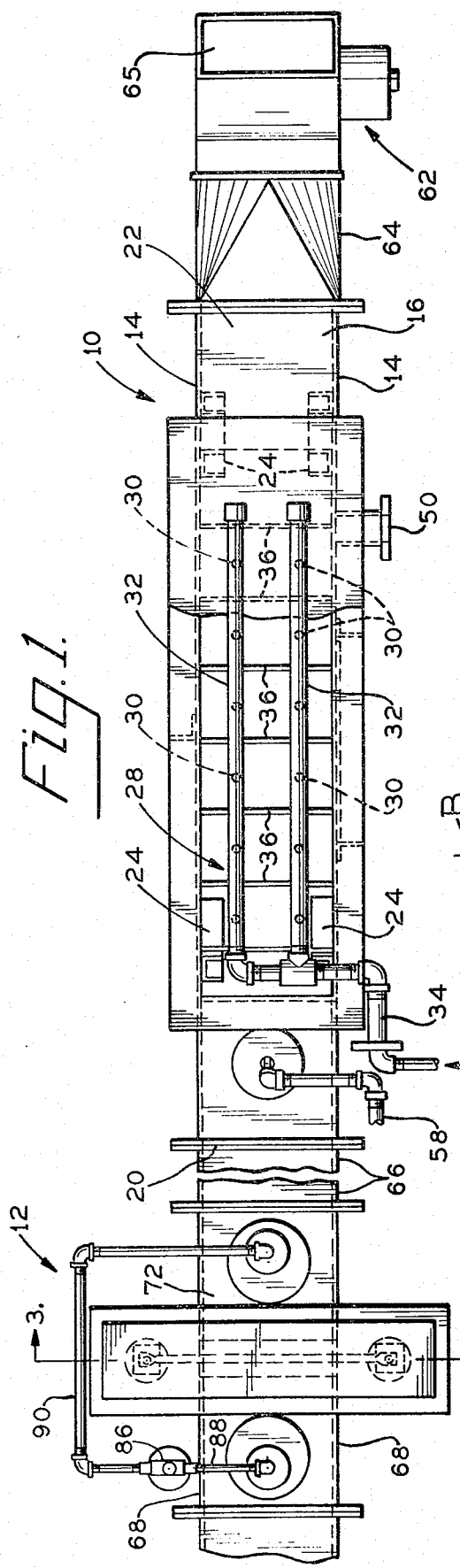
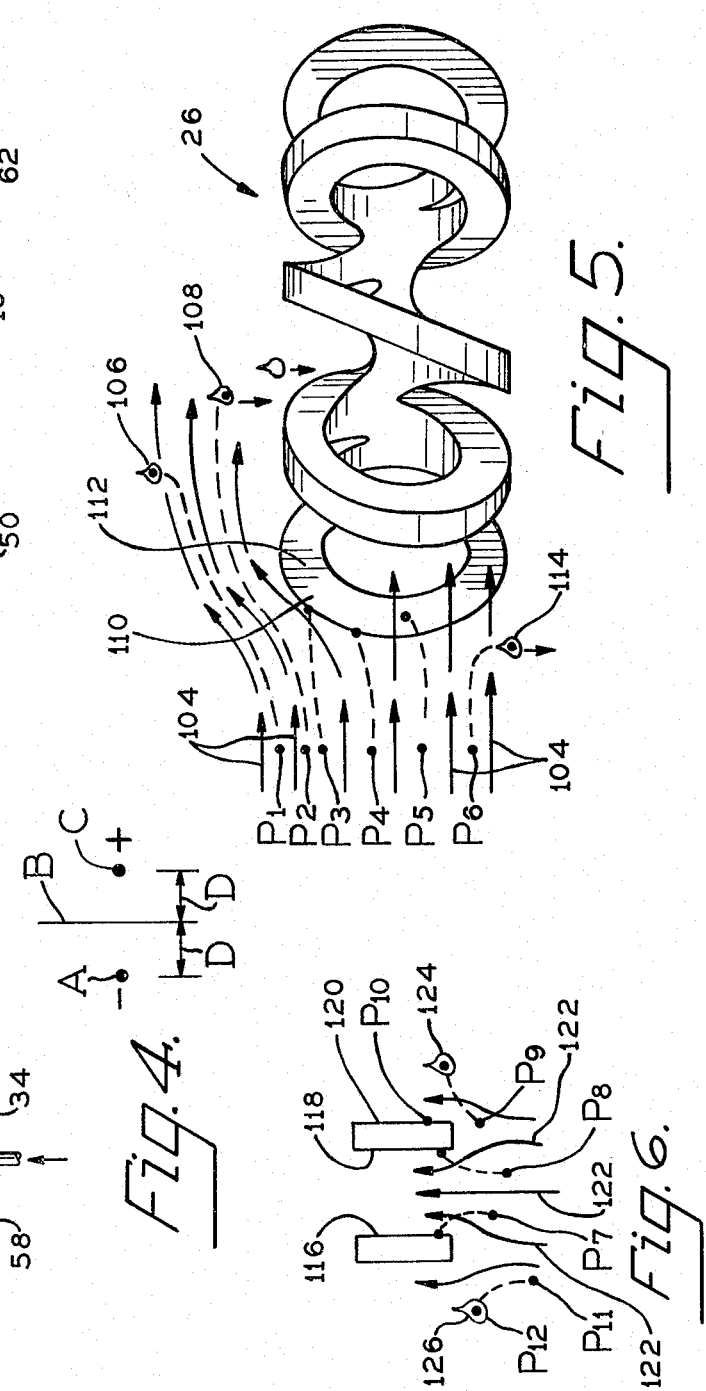
INVENTORS.
WARREN L. KLUGMAN
JEROME KOSMIDER
BY
Meyer, Tilberry & Body
ATTORNEYS.

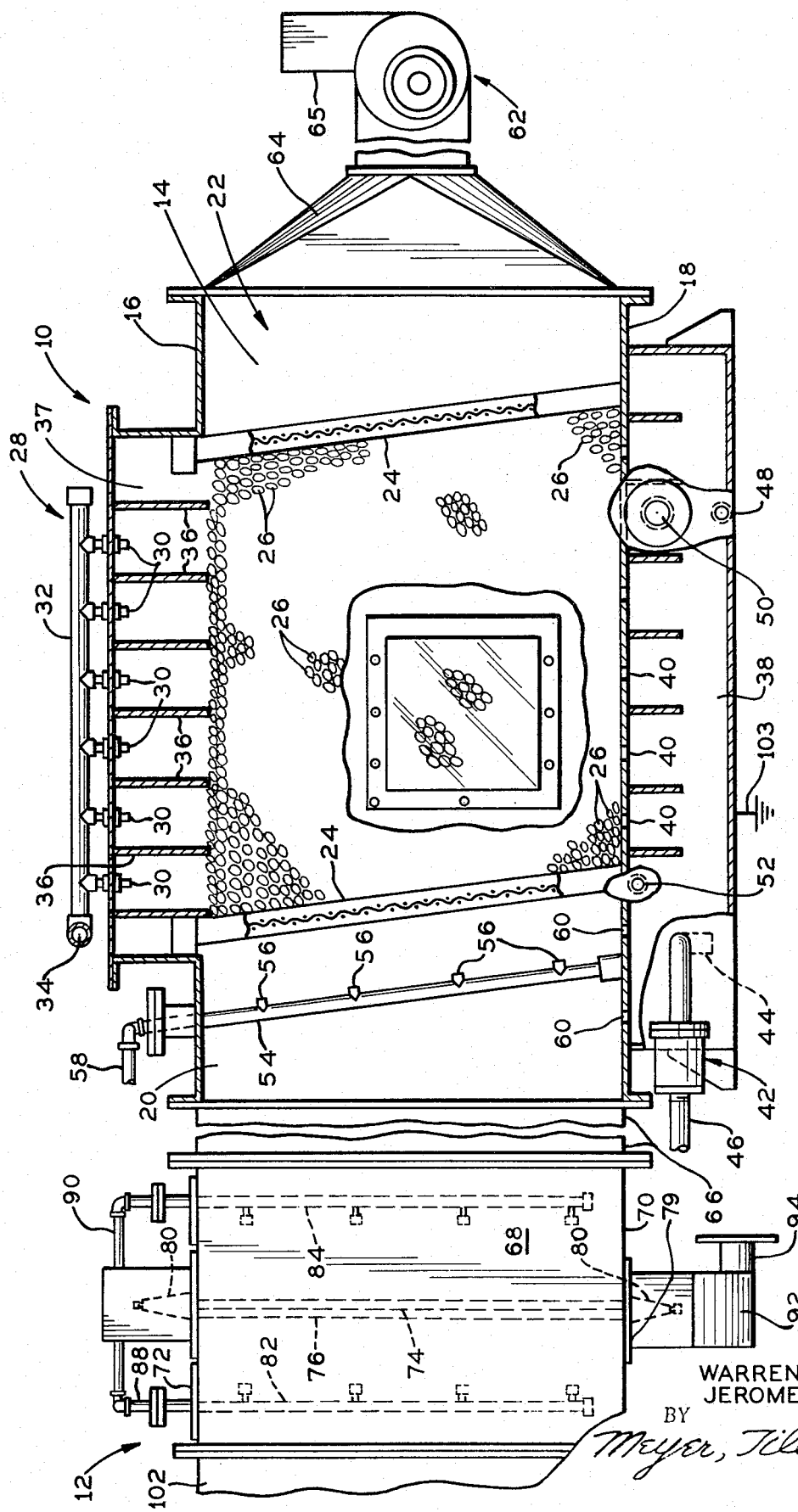

3,874,858

METHOD AND APPARATUS FOR ELECTROSTATIC REMOVAL OF PARTICULATE FROM A GAS STREAM

This is a continuation, of application Ser. No. 165,209 filed July 22, 1971 now abandoned.

This invention relates to the art of cleaning gas streams and, more particularly, to the provision of a method and apparatus for removing finite particulate material from a gas stream by particle charging and wet scrubbing.

Apparatus of many forms have been provided heretofore for the purpose of wet scrubbing a gas stream to remove particulate material therefrom. One of the most successful of such apparatus is a low energy packed scrubber which includes a chamber filled with a given volume of randomly oriented packing elements through which a scrubbing liquid such as water is flowed by gravity and through which a gas stream to be cleaned is flowed at low velocity and in a direction corresponding to, opposite to, or transverse to the direction of flow of the scrubbing liquid. Large particle removal in such apparatus is achieved primarily by impaction of particles with the scrubbing liquid flowing therethrough and with the packing elements in the chamber. In this respect, particulate matter in the gas stream contacts scrubbing liquid droplets and becomes entrained therein or impacts against surfaces defined by the packing elements. A particle entrained in a liquid droplet travels therewith through the packing chamber to the sump of the apparatus. Particles which impact against a surface of a packing element are washed therefrom by the scrubbing liquid and are carried from the chamber to the sump area by the scrubbing liquid.

Packed scrubbing apparatus of the above character, depending on the particular packing used, can be extremely effective in removing particles of 1 micron or larger from a gas stream. In this respect, such apparatus can be substantially 100% efficient in removing particles which measure 3 microns or larger in size. Certain of the particles in a gas stream which measure between 1 and 3 microns in size, and those particles which are submicron in size, however, tend to remain entrained in the gas stream and flow therewith around the scrubbing liquid droplets and the packing elements in the chamber and, accordingly, are exhausted with the cleaned gases which pass through the scrubbing apparatus. Thus, while the apparatus is extremely efficient in cleaning contaminated gas streams, it remains that extremely small particulate matter is not separated from the gas stream and is exhausted therewith from the apparatus. With the emphasis which is placed on avoiding pollution or contamination of air, collection of even the extremely small particulate matter which now escapes scrubbing apparatus of the above character is highly desirable.

Other low energy types of wet scrubbing apparatus have also been employed heretofore for removal of particulate material from a gas stream. Such other devices include, for example, wet cyclone scrubbers, spray towers and spray chambers, tray towers of the character employing an impingement plate, and bubble towers. While the latter devices do enjoy a degree of efficiency in removing particulate matter from a gas stream, none of these is generally as efficient in such removal as is the packed type scrubber. Further, none of the latter scrubbers has the ability to remove to any reasonable degree the ultrafine particles of micron or submicron size.

In the past, micron or submicron size particles have been removed from a gas stream by the use of fabric filters, electrostatic precipitators, or high-energy venturi-type scrubbers. Devices of the latter character, while operating to remove ultrafine particles from a gas stream, have several disadvantages. In this respect, fabric filters are bulky and involve a high capital investment. Further, such filters are limited in temperature capabilities, cannot absorb gases, plug easily when handling sticky materials and are limited in corrosive environments. Still further, the use of fabric filters results in extremely high maintenance costs. Electrostatic precipitators capable of finite particle removal are disadvantageous in that they are undesirably large and involve an extremely high capital investment, especially when constructed for corrosive environments. Electrostatic precipitators also experience operational difficulties if the contaminates to be removed from a gas stream are wet or sticky. Moreover, for electrostatic precipitators to be efficient in removing particles in the submicron ranges, the equipment must be considerably enlarged. Still further, electrostatic precipitators cannot absorb gases, and the cost of maintenance thereof is extremely high. The third type of wet scrubber mentioned above, namely high-energy venturi-type scrubbers, have extremely high-energy requirements and thus are extremely costly to operate. For example, the pressure drop of gas flow through a venturi-type scrubber generally is from 10 to 100 inches water gauge, and the gas flow velocity is generally from 125 to 500 feet per second through the venturi throat. It will be appreciated, therefore, that the equipment necessary to operate such a scrubber, such as large power equipment, is also subject to high maintenance and replacement costs.

The present invention advantageously overcomes the disadvantages of the devices heretofore known, including those disadvantages specifically pointed out above, and in this respect provides a method and apparatus by which the effectiveness and efficiency of low-energy wet scrubbing devices is considerably increased. The increase in effectiveness and efficiency is achieved by providing for the removal of solid or liquid particulate entrained in a gas stream by electrostatically charging the particles in the gas stream and flowing the gas stream at low velocity through a contact zone for contact with neutral surface means. A low-energy wet scrubber of the character contemplated in accordance with the present invention has the advantages of low-energy consumption, low installation and maintenance costs, adaptability for corrosive environments and the ability to absorb contaminate gases simultaneously with the removal of particulate matter from a gas stream. Moreover, the present invention advantageously provides for low-energy wet scrubbing which not only removes the customary large particulate but also effectively removes particulate which is of micron and submicron size.

The method and apparatus of the present invention provides for low-energy wet scrubbing of gases to remove both large and small particulate, to remove both particulates and contaminate gases, and to condense vapors to form liquid particulates which are then removable from a gas stream. As an example of particulate removal, the present invention can be employed to remove particulate in cupola discharge gases from gray iron foundries, and $H_2SO_4$ particulate in mists from sulphuric acid plants. With regard to removal of both particulates and gases, the invention finds considerable utility in conjunction with aluminum reduction facilities producing hydrogen fluoride gases and particulates, phosphate fertilizer plants producing hydrogen fluoride gas and particulates, and fossil fuel burning boilers producing sulphur dioxide gas and flyash particulate. Further, with regard to the removal of liquid particulate, the invention finds utility, for example, in cleaning odoriferous liquid particulate from rendering operations.

In accordance with the present invention, a particle laden gas stream is cleaned by ionizing the gas to impart an electric charge to particles therein and then flowing the gas through a spatial contact zone for contact with electrically neutral scrubbing liquid in a form defining a plurality of individual moving neutral surfaces, whereby the charged particles in the gas stream are attracted to the neutral liquid surfaces. More particularly, the particles are given a charge, such as a negative charge, for example, by ionizing means disposed in the path of the gas stream to be cleaned. The particles flowing through the contact zone in the gas stream have a charge of the same polarity and, accordingly, are not attracted to one another. The particles are, on the other hand, attracted to the electrically neutral surfaces defined by the scrubbing liquid as a result of the force of attraction therebetween. To assure the probability that particles will be removed from the gas stream by such attraction forces, the gas stream is flowed through the apparatus with a velocity which is sufficiently low for the attraction forces to overcome particle velocity and the viscous drag force of the gas on particles entrained in the gas stream. It will be appreciated that if the velocity of the gas stream relative to the neutral surface means is too high, smaller particles in the gas stream will remain entrained therein and thus will be carried past the neutral surfaces and will be exhausted from the apparatus in the gas stream.

The method and apparatus of the present invention are to be distinguished from electrostatic precipitators of the wet variety, and from the combination of electrostatic precipitators with wet scrubbers. In this respect, conventional electrostatic precipitators operate on the principle of first charging a particle in an ionizing section and then passing the particle through an imposed electrostatic field wherein Coulomb forces act to drift the particle to a collecting surface. Coulomb forces are those forces acting on a charged particle in an electrostatic field. Thus, the action of a conventional electrostatic precipitator depends on both the charge on the particle and the applied electrostatic field. Conversely, in accordance with the present invention, there is no imposed electrostatic field and therefore there is no dependency on Coulomb forces. A conventional wet electrostatic precipitator provides for flushing liquid to flow across the collecting surface to remove collected material therefrom. Such a precipitator employs the effects of an electrostatic field as mentioned above.

Scrubbing apparatus in accordance with the present invention may take any number of a variety of forms and, in its broadest aspects, is comprised of surface means including a plurality of moving electrically neutral surfaces defined by scrubbing liquid flowing in the contact zone of the apparatus in the form of a plurality of liquid sheets, liquid streams, liquid droplets, or the like, and which surfaces are adapted to contact the gas to be cleaned. The liquid flow rate preferably is within the range of from 1,000 to 100,000 pounds per hour per square foot of the contact zone measured transversely of the direction of liquid flow. The surface means may further include surfaces defined by, for example, the apparatus walls, trickle plates along which the scrubbing liquid flows, splash plates upon which the liquid impinges, baffle components which cause the liquid to follow a tortuous path, a porous mass of material such as randomly oriented packing elements, or other suitable surface means. The scrubbing liquid flow may be a forced flow or a gravity flow and may be introduced in any suitable manner such as by spray nozzles, overflow troughs, perforated distributor boxes, or the like. The flow of the gas stream to be cleaned is at a low velocity and may be in the same direction as the liquid flow, in a direction opposite to that of the liquid flow or in a direction which is transverse or lateral with respect to the direction of liquid flow. The gas velocity preferably is within a range of from approximately 0.2 to 35 feet per second, and it will be appreciated that the gas velocity and liquid flow rate are interrelated such that a higher gas velocity requires a lower liquid flow rate. More particularly, as gas velocity is increased lower liquid flow rates must be used to keep the pressure drop low and avoid flooding. In any event, the gas stream is caused to flow at a low velocity relative to the neutral surface means and charged particles therein either impinge against the neutral surface means or are carried by the gas stream in close proximity thereto so that the force of attraction between the charged particles and neutral surface means will overcome the velocity of the particles and drag force of the gas stream thereon, thus to remove the particles from the gas stream by attraction to the neutral surfaces.

In accordance with a narrower aspect of the present invention, the liquid scrubbing apparatus includes randomly oriented filamentous packing elements of dielectric material through which scrubbing liquid flows by gravity vertically downwardly along a tortuous path and through which particle laden gas flows along a tortuous path in the same or opposite direction or in a direction transverse to the direction of liquid flow. The filamentous packing elements include narrow elongated filaments defining numerous surface means against which the scrubbing liquid droplets impinge during travel through the packing mass and by which the liquid droplets are broken and/or the flow thereof redirected. As the particle laden gas passes through the packing mass in a tortuous path caused by the packing elements, particles entrained in the gas stream will at some point either impinge against a filament surface or pass in close proximity thereto while entrained in the gas stream. Other particles in the gas stream will at some point impinge against scrubbing liquid droplets descending through the mass or will pass in close proximity thereto. In either event, the force of attraction between the charged particles and neutral packing elements and scrubbing liquid will cause the particles to be attracted to the scrubbing liquid or packing elements and be removed from the gas stream. Particles so attracted will be carried from the packing mass by the flow of the scrubbing liquid therethrough. By providing a filamentous packing, the number of individual surfaces is increased which increases the extent to which liquid droplets are formed. Moreover, the surfaces defined by the filaments of the packing are individually small and more effective as a result of the large number thereof. The increase in surfaces and droplets in turn increases the probability of charged particles passing sufficiently close thereto at some point during travel through the apparatus for the force of attraction to be effective to remove the particles from the gas stream.

The ionizing means employed to impart an electrostatic charge to particles in the gas stream may be of any suitable construction such as a wire and plate type, or a tube and wire type. Normally, a negative charge is imparted to the particles in the gas stream for best corona discharge, but the charge can be positive. Further, alternate positive and negative charges can be imparted to succeeding portions of particles in a gas stream such as by employing alternating current to energize the ionizer means. The nature of the particles to be removed from the gas stream will in part determine the polarity which provides for the best results to be achieved. The apparatus can be designed for various air velocities, it only being necessary that the particles have adequate residence time in the ionizer zone in order to be adequately charged. Thus, a unit can be provided with a short ionizer zone and a low gas velocity, or a longer ionizing zone and a higher velocity. The velocity will, of course, be maintained sufficiently low to provide for particle removal in the manner hereinabove set forth. Under certain circumstances involving the scrubbing of hot gases or gases carrying sticky viscous particulate matter, it may be desirable to quench the gas stream prior to entry thereof into the scrubber housing. This can advantageously be achieved by employing neutral liquid spray or the like between the ionizer and scrubber housing, whereby the quenching further enhances particle removal in accordance with the principles of the present invention. The scrubbing liquid is quite frequently water; however, any suitable scrubbing liquid may be employed. If quenching is desired, the scrubbing liquid may also be used for this purpose.

The most pertinent prior art of which applicants' are aware relating to the charging of particles in a gas stream and the subsequent removal of the particles from the gas stream includes U.S. Pat. Nos. 2,621,754 to Doyle, 3,218,781 to Allemann et al., 3,363,403 to Vicard, German Pat. No. 1,025,390 and French Pat. No. 500,775. The present invention clearly distinguishes from the methods and apparatus disclosed in these patents. In this respect, with regard first to the patent to Doyle, a particle laden gas stream is ionized and then flowed at high velocity through a venturi-type high-energy scrubber. The particle laden gas is flowed at a velocity of from a minimum of 40 feet per second up to 250 feet per second into a splash tank containing water. Such high velocities cause the gas to impinge against the surface of the water with considerable force creating a turbulance within the splash tank. Such apparatus distinguishes considerably from low-energy apparatus of the character of the present invention wherein the maximum gas velocity is approximately 35 feet per second and there is no high-energy turbulence created as a result of gas and liquid contact. The patent to Vicard also discloses a high-energy venturi-type scrubber. Moreover, in this instance the gas stream is first supersaturated with a vapor. The gas stream is then suddenly expanded in a venturi where part of the vapor condenses on the particles in the gas stream enlarging them and coating them with a liquid film. The gas stream is also given a high rotational motion by vanes, after which the vapor filmed particles are subjected to an integral electrostatic precipitator section of the common rod-and-tube style wherein the filmed particles are charged and acted upon by the imposed electrostatic field.

The patent to Allemann et al. discloses apparatus by which particle laden gas is bubbled through a body of liquid such as water. The particle laden gas is ionized to impart a charge to the particles therein and the water through which the gas is bubbled is maintained neutral. Thus, as the gas bubbles containing particles pass through the water the particles are attracted to the water. While the apparatus is capable of removing particles from a gas stream by attraction forces, it remains that the apparatus is of a distinctively different character from the low energy scrubbing devices which are within the realm of the present invention. In this respect, bubble scrubbers of the character disclosed in the patent to Allemann et al. have an extremely low capacity for handling gas, are subject to plugging because of the small orifices employed, and the gas must be bubbled through a body of water having considerable depth, whereby a considerably pressure drop is experienced. Further, as the number of bubble trays is increased to increase the efficiency of the apparatus, the pressure drop through the apparatus is accordingly increased.

German Pat. No. 1,025,390 discloses a system of removing particulate matter from a gas stream by imparting a charge to particles in the gas stream and then providing for the particles to be attracted to a film of water. The apparatus in this instance operates on the principle of an electrostatic precipitator in that the film of water surrounds an electrode and serves as a collecting surface to which particles are attracted by the field effect principle of electrostatic precipitators, as opposed to the force of attraction principle employed in accordance with the present invention. French Pat. No. 500,775 also discloses electrostatic wet precipitator apparatus of the character wherein an electrostatic charge is imparted to particles in a gas stream and an imposed electrostatic field is employed to cause attraction of the particles to collecting surfaces. In the French patent collecting plates of the precipitator are spaced axially downstream from grid type electrode means as opposed to having the collecting plates in the form of elongated plates extending continuously from the grids. A potential difference is maintained between the grid means and the collecting means, whereby particles in the gas stream are charged as they move through the space between the grid means and plate means. The spacing of these components in the direction of gas flow merely provides for the direction of movement of the particles in the gas stream to supplement the effect of the imposed electrostatic field wherein Coulomb forces act to drift the particles in the direction of gas flow toward the collecting plates. The grid means in the device of the French patent can not alone operate to charge particles flowing therepast. Rather, the particles must be in the zone or space between the grid means and collector plates in order to be charged.

An outstanding object of the present invention is the provision of low-energy wet scrubbing apparatus having the ability to remove particulate matter from a gas stream to a greater extent and in a manner more efficient than heretofore possible.

Another object is a provision of apparatus of the above character in which the efficiency of particle removal from a gas stream is increased by combining the effects of low energy gas flow, wet scrubbing and particle charging.

Yet another object is the provision of low energy wet scrubbing apparatus of the above character having the ability to absorb contaminate gases simultaneously with the removal of solid and/or liquid particulate matter from a gas stream.

A further object is the provision of apparatus of the above character wherein solid and/or liquid particles entrained in a gas stream are electrically charged and flowed at a low velocity relative to neutral surfaces in wet scrubbing apparatus, thus to effect particle separation by a force of attraction existing between the charged particles and the neutral surfaces.

Yet another object of the present invention is the provision of apparatus of the above character wherein solid and/or liquid particles entrained in a gas stream are electrostatically charged and wherein the scrubbing apparatus and scrubbing liquid in droplet form are maintained electrically neutral, thus to effect particle separation by an attraction force existing between the charged particles and neutral apparatus and scrubbing liquid.

Still another object of the present invention is the provision of apparatus of the above character wherein packing elements of the apparatus and scrubbing liquid droplets flowing therethrough define surfaces which are maintained electrically neutral to effect particle separation.

Still another object of the present invention is the provision of apparatus of the above character which is economical to produce, operate and maintain.

A further object of the present invention is the provision of a method of removing particulate matter from a gas stream employing low-energy wet scrubbing apparatus.

Still another object of the present invention is the provision of a method of removing solid and/or liquid particles from a gas stream which is more economical and more efficient than particle removing methods heretofore known.

A further object is the provision of a method of removing solid and/or liquid particles from a gas stream and, simultaneously therewith, absorbing contaminate gases from the stream.

Still a further object of the present invention is the provision of a method of removing particles from a gas stream by imparting an electrostatic charge to the particles while maintaining the scrubbing liquid electrically neutral, whereby a force of attraction exists between the charged particles and scrubbing liquid to effect particle removal from the gas stream.

Yet another object is to provide a method of particle removal by charging particles in a gas stream and flowing the charged particles at a low velocity relative to neutral surface means and electrically neutral scrubbing liquid, so that the attraction forces between the particles and the surface means and scrubbing liquid overcome particle velocity and the drag force of the gas stream thereon, whereby particles are attracted to the surface means and liquid and thus removed from the gas stream.

The foregoing objects and advantages of the present invention will in part be obvious and in part more fully pointed out hereinafter in conjunction with the description of the drawing in which:

FIG. 1 is a plan view of one embodiment of apparatus within the present invention;

FIG. 2 is a side elevation view, partially in section, of the apparatus of FIG. 1;

FIG. 4 is a schematic illustration of the attraction force principle of the present invention.

FIG. 5 illustrates a filamentous packing element, and schematically illustrates the manner in which particles are removed from a gas stream in accordance with principles of the present invention; and FIG. 6 is a further schematic illustration of the manner in which particles are removed from a gas stream in accordance with the present invention.

Figure 3:
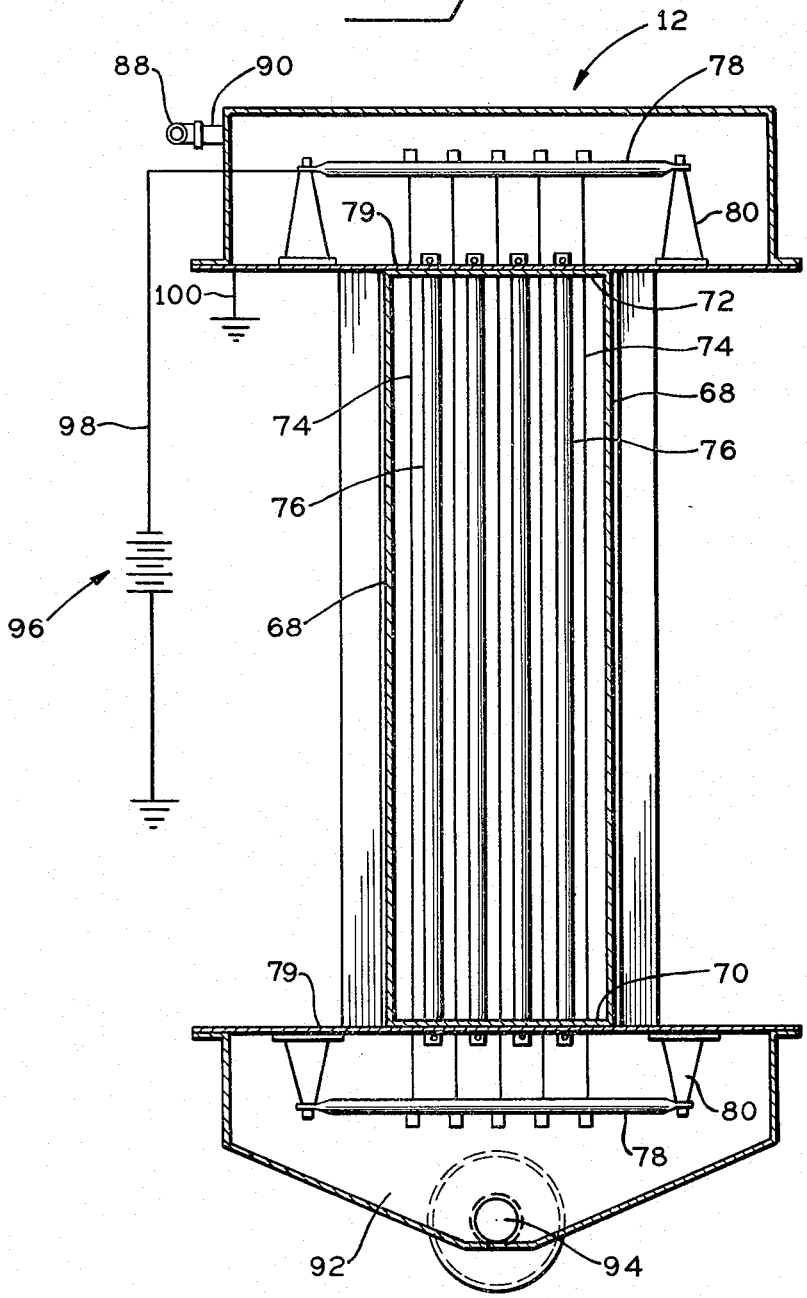
FIG. 3 is a sectional elevation of the ionizer portion of the apparatus of FIGS. 1 and 2, the section being taken along line 3—3 in FIG. 1.

Referring now to the drawing in greater detail wherein the showings are for the purpose of illustrating a preferred embodiment of the invention only and not for the purpose of limiting the same, apparatus is illustrated in FIGS. 1–3 which includes wet scrubbing means 10 and ionizing means 12. Scrubbing means 10 is comprised of a housing which in the embodiment illustrated is rectangular in cross-sectional configuration and includes a pair of opposed sidewalls 14, a top wall 16, and a bottom wall 18. Walls 14, 16 and 18 may be of any suitable metallic or non-metallic material and may, for example, be formed by fiberglass impregnated with polyester resin to protect the apparatus from the effects of corrosive atmosphere. The housing defines a spatial contact zone having an inlet end 20 for entrance of gas to be cleaned and an outlet end 22 from which cleaned gas is exhausted. A pair of support means 24 are suitably supported within the contact zone adjacent the inlet and outlet ends thereof for the purpose of supporting a mass of randomly oriented packing elements 26 disposed in the housing. Packing elements 26 preferably are filamentous elements of dielectric plastic material such as for example, polyethylene, polypropylene, polyvinylchloride, nylon, and the like. It will be understood, however, that other non-conductive materials such as ceramics may be used and that conductive materials may be used. Support means 24, of course, is open to permit the flow of gas therethrough and may, for example, be in the form of grids wherein the openings are small enough to prevent displacement of packing elements 26 therethrough.

Packing elements 26 are randomly dumped or poured into the housing and define a porous mass substantially filling the space between side walls 14, bottom wall 18, top wall 16 and support plate means 24. The packing elements and housing walls define static surface means in the contact zone. The term static is intended to distinguish from movement through the contact zone and is not intended to preclude movement of the surface means within the zone such as by vibrating the apparatus or packing elements to cause displacement thereof within the contact zone. In other words, the term static means that such surface means is confined within or substantially within the contact zone. Spray means 28 is associated with top wall 16 for introducing liquid into the contact zone and is comprised of a plurality of nozzle means 30 opening above the mass of packing elements and interconnected with a corresponding one of a pair of header conduits 32. Headers 32 are connected to a common inlet conduit 34 which is connected to scrubbing liquid circulating pump means, as set forth hereinafter. Nozzles 30 serve to spread scrubbing liquid horizontally and transversey across the top surface of the packing mass. Baffle plates 36 may be provided between adjacent longitudinal pairs of nozzles 30 so as to prevent gas from flowing across the top surface of the packing mass and thus bypassing the mass. The scrubbing liquid flows by gravity downwardly through the packing mass to a collection chamber or sump 38 disposed below bottom wall 18 of the housing. A portion of the packing adjacent to the outlet end of the scrubber and underlying an area 37 adjacent the endmost spray nozzle 30 preferably is purposely not irrigated by scrubbing liquid flow from above and thus defines a demisting section or area of the packing for removal of liquid mist from the gas stream prior to exhaust thereof from the apparatus.

Bottom wall 18 is provided with a plurality of drain holes 40 which permit the scrubbing liquid to pass through the bottom wall and into the sump. Pump means 42 is associated with sump 38 and includes an inlet conduit 44 disposed above the bottom surface of the sump and below a liquid level maintained therein. Pump means 42 further includes an outlet conduit 46 which leads to scrubbing liquid header conduit 34. Thus, scrubbing liquid passing through the packing mass and to the sump therebeneath is adapted to be pumped back to the spray headers for recirculation. Particulate matter carried by the scrubbing liquid or washed from the packing elements by the scrubbing liquid enters sump 38 and a certain amount thereof collects on the bottom surface of the sump. Such collected particulate may be removed as necessary through a drain opening 48 disposed adjacent the bottom surface of the sump. An overflow outlet 50 is provided together with a scrubbing liquid make-up inlet conduit 52 for the purpose of continuously adding make-up liquid to the system to provide a continuous overflow through outlet 50 by which particulate material suspended in the scrubbing liquid is continuously removed from the sump.

A spray header 54 having a plurality of spray nozzles 56 spaced therealong is provided between inlet end 20 of the scrubber housing and the adjacent packing support means 24. Nozzles 56 are directed toward support means 24 and provide for washing the support means to prevent accumulation of particulate thereon in response to flow of a particle laden gas stream through the scrubber apparatus. Inlet end 58 of spray header 54 maay be connected to any suitable source of liquid, not shown, and may be connected with the scrubbing liquid supply system including pump means 42. Openings 60 in bottom wall 18 of the housing provides for liquid discharged through the spray nozzle 56 to be returned to the sump area.

Flow of a particle laden gas stream through the apparatus may be achieved in any suitable manner and, for example, may be induced by fan means 62 associated with outlet conduit means 64 suitably attached to the outlet end 22 of the scrubber housing. Fan means 62 may be any one of a variety of types of fans and will be of a size and will be operated in accordance with the velocity of flow sought for the gas to be cleaned. The outlet 65 of the fan means will, of course, be associated with suitable exhaust stack means, or the like.

Ionizer means 12 is associated with inlet end 20 of the scrubber housing by conduit means 66. It will be appreciated, however, that the ionizer section could be directly connected to the inlet end of the scrubber housing as opposed to being spaced therefrom by conduit means. The ionizer means functions to charge particles in a gas stream independent of any physical relationship with respect to the location thereof relative to the scrubber housing inlet or the contact zone. The ionizer means may take any suitable form and the specific structure thereof does not form a part of the present invention. In the embodiment illustrated, the ionizer section includes a housing which is rectangular in cross-sectional configuration and which includes a pair of opposed side walls 68, a bottom wall 70 and a top wall 72. A plurality of alternately disposed corona wires 74 and tubes 76 extend between bottom wall 70 and top wall 72 in substantially parallel alignment with one another and with sidewalls 68. Wires 74 are supported under tension by means of cross bars 78 of conductive material and insulating components 80 disposed at opposite ends thereof. Insulating components 80 are supported by corresponding conductive plate elements 79 at the top and bottom of the ionizer housing, and tubes 76 extend between and are suitably conductively interconnected with plates 79. Spray headers 82 and 84 extend downwardly through the ionizer housing and are provided with corresponding spray nozzles which are directed towards wires 74 and 76. Spray headers 82 and 84 permit intermittent or continuous spraying of the ionizer components to prevent particle accumulation thereon and are supplied with a spraying liquid from a suitable source of supply, not illustrated, which is connected thereto by means of a conduit 86 and lines 88 and 90. Spray cleaning may, of course, be achieved in a manner other than that illustrated. For example, tubes 76 may be provided with apertures opening toward an adjacent tube and the tubes connected to a source of fluid such as water, solvent or steam, whereby one tube is sprayed by fluid discharged from another. Moreover, such spray cleaning or other forms of spray cleaning can be employed in conjunction with spray headers 82 and 84 or separately therefrom. The bottom of the ionizer housing is provided with a sump 92 into which the liquid drains and from which the liquid is drained by means of an outlet conduit 94. The washing liquid may be recirculated to the ionizer spray headers or may be discharged to a drain. It will be appreciated too that other means for cleaning the ionizer may be employed in conjunction with or separate from liquid spray cleaning. For example, mechanical cleaning by vibration, rappers, scrapers, or the like, and cleaning by steam or air blast may be used. Moreover, steam heating of ionizer surfaces may be employed to remove or loosen sticky, viscous materials so they will flow from the surfaces more readily.

Corona wires 74 are connected by lead 98 and one of the cross bars 78 to one side of a suitable high voltage DC power supply 96 having its other side connected to ground. Tubes 76 and the remainder of the ionizer housing are connected to ground such as by a lead 100 connected to metal plate 79 at one end of the tubes. The output requirements for the power supply will vary depending on such factors as wire and tube spacing. Generally, an output in the range of between 5 to 150 kilovolts will be employed. The inlet side of the ionizer is connected by means of a duct 102 to the apparatus or system discharging particle laden gas which is to be cleaned. Although tube and wire ionizer means is illustrated herein, it will be appreciated that ionization may be achieved in any suitable manner and by any suitable device such as, for example, a radiation ionizing device.

To assure that the scrubbing apparatus, liquid and packing remain electrically neutral and are not affected by the charged particles, the apparatus is suitably grounded, such as is indicated by lead 103 which is connected to the scrubber sump. With regard to maintaining the scrubbing apparatus, packing and liquid neutral, the scrubbing liquid is recirculated in contact with the wall surfaces of the scrubber and the surfaces of the packing elements and, being conductive, assures that these surfaces are continuously neutralized. When the liquid reaches the sump, neutralizing of the liquid is assured by the grounding of the sump. If the walls and/or packing elements are conductive, neutralization thereof is enhanced by grounding of the apparatus. The liquid droplets, of course, define collecting surfaces moving through the packing elements and upon contact of a droplet with a charged particle the particle is neutralized and its charge is imparted to the droplet. The mass of the water droplets is large, however, relative to the mass of the particles and, therefore, the charge imparted to a given droplet is not of a magnitude which will appreciably offset the neutral character of the droplet. Moreover, the total mass of neutral droplets constantly flowing through the apparatus is considerably greater than the total mass of particles in the apparatus at any given time, whereby the neutral character of the liquid and other surfaces in the apparatus is not affected by the imparting of particle charges thereto.

Separation of large particulate matter from a gas stream employing apparatus of the foregoing embodiment is achieved primarily by inertial impaction of particles with liquid droplets and other surface means within the apparatus. Such inertial impaction is enhanced by attraction forces between charged particles and the neutral surfaces. It is believed, as will be discussed hereinafter with regard to FIGS. 4, 5 and 6 of the drawing, that separation of small particles including particles of micron and submicron size is achieved primarily by attraction of particles to neutral surfaces in the apparatus. Such attraction results from movement of the particles in close proximity to the neutral surfaces and at a velocity sufficiently low for the force of attraction between the particles and surfaces to overcome the particle velocity and the drag force of the gas stream on the particle, whereby the particle leaves the gas stream and contacts the surface. It is believed too, that the attraction forces established in accordance with the present invention provide for inertial impaction of micron and submicron particles with neutral surfaces, whereas inertial impaction of such small particles heretofore was not achieved. It is further believed that the charged particles, being mutually repelling, oppose the tendency for particles to approach one another when moving in the gas stream between spaced neutral surfaces and thus causes the particles to approach the neutral surfaces in such close proximity that removal by attraction to the surfaces is achieved. Yet another effect believed to take place within the apparatus is agglomeration of small particles as a result of attraction between a charged particle moving in the gas stream and a particle which has become neutral as a result of contact thereof with a neutral surface in the apparatus. Still a further possible effect is that the mutual repulsion of particles tends to drive an outer boundary layer thereof into such close proximity with wall surfaces of the apparatus and outer regions of the packing mass that the attraction forces are effective to overcome particle velocity and the drag force of the gas thereon, whereby particles are attracted to these surfaces.

The attraction force between a charged particle and neutral surface will best be understood with reference to FIG. 4 of the drawing. In this respect, if a particle A having an electrostatic charge of, for example, negative polarity is brought near an electrostatically neutral surface B, it will induce an electrostatic charge of opposite polarity on the surface B, whereby a force of attraction exists between negatively charged particle A and the now positively charged surface B. The magnitude of the force of attraction is a function of the magnitude of the charge of particle A and the distance D between the particle and surface B. The attraction between the charged particle and the surface with its induced charge is comparable to the force of attraction which would occur between the charged particle A and a charged particle C having an equal charge of opposite polarity and disposed on the opposite side of surface B and at the same distance D therefrom. This comparison employing an equal but opposite polarity charge disposed on the opposite side of surface B is likened to a mirror image and has been termed in literature as an image force. Thus, for example, the force of attraction between particle A and surface B is an image force substantially equal to the force between particles A and C. It is such an image force or force of attraction which exists between a charged particle and neutral surface means in accordance with the present invention as a result of imparting a charge to the particles in a gas stream and maintaining the surface means neutral.

The manner in which the attraction forces are believed to affect particle separation is schematically illustrated in FIGS. 5 and 6 of the drawing. In this respect, with reference first to FIG. 5, an individual packing element 26 is illustrated which, in the preferred embodiment, is in the form of a torous-like ring structure of filamentous plastic material or the like. Packing elements of this character are well known, are disclosed in U.S. Pat. No. 2,867,425 to Teller, and are sold under the trademark "TELLERETTE" by the assignee of the present invention. As mentioned hereinabove, packing elements 26 are randomly oriented in the scrubber housing and, for purposes of illustrating the operation of the apparatus of the preferred embodiment, it is presumed that the illustrated packing element is oriented with the axis thereof extending vertically relative to the scrubber housing.

Each packing element 26 is comprised of a plurality of surfaces disposed in the path of scrubbing liquid descending through the packing element and the gas stream which, in this embodiment, is flowing through the element from left to right and thus transverse to the liquid flow. As the gas stream flows through the packing element it flows against and around the surfaces of the packing element and thus follows a tortuous path during its travel therethrough. Particulate contaminates in the gas stream have a charge imparted thereto as a result of their passage through the ionizer and the charged particles entrained in the gas stream then pass through the packing element and are removed from the gas stream by contacting either neutral liquid droplets or other neutral surface means defined by the packing element. Such contact results from or is enhanced by the forces of attraction existing between the charged particles and the neutral scrubbing liquid and other surface means.

More particularly, with reference to FIG. 5, a plurality of charged particles $P_1 - P_6$ are illustrated as entering the scrubbing apparatus from the ionizing section entrained in the gas stream as represented by arrows 104. As the gas stream flows at a low velocity against and around packing element 26 and scrubbing liquid droplets descend relative thereto, particles $P_1 - P_6$ are removed from the gas stream in accordance with the following examples. Particle $P_1$ is entrained in the gas stream at a distance sufficiently removed from the packing element that it will remain entrained in the gas stream and flow upwardly and over the packing element therewith. As particle $P_1$ moves across the packing element, however, it is carried into such close proximity with a scrubbing liquid droplet 106 that the velocity of the particle and the drag force of the gas stream thereon is overcome by the forces of attraction existing between the liquid droplet and particle. Thus, particle $P_1$ is removed from the gas stream and will be carried from the packing mass with droplet 106. Particle $P_2$ also is disposed a distance from the packing element such that it remains entrained in the gas stream. In this instance, however, particle $P_2$ is illustrated as impacting against a scrubbing liquid droplet 108. It will be appreciated that the force of attraction existing between particle $P_2$ and droplet 108 will enhance impaction therebetween. Particle $P_3$ flows in the gas stream sufficiently close to surface 110 of the packing element for the force of attraction therebetween to overcome the velocity of the particle and the drag force of the gas stream whereby particle $P_3$ leaves the gas stream and contacts surface 110. Particle $P_4$ is located in the gas stream so as to engage surface 110 by inertial impaction which, of course, is enhanced by the force of attraction with exists therebetween as the particle approaches surface 110. Particle $P_5$ is illustrated as being entrained in the gas stream and passing laterally adjacent surface 112 of the packing element. Particle $P_5$ is attracted to surface 112 due to the force of attraction therebetween and, accordingly, is removed from the gas stream. Particle $P_6$ is illustrated as being removed from the gas stream ahead of the packing element by being attracted to a scrubbing liquid droplet 114 by the force of attraction therebetween.

Further illustrations of particle removal are illustrated in FIG. 6 of the drawing. In this respect, neutral surfaces 116, 118 and 120 are illustrated which might, for example, be defined by filament portions of a pair of adjacent packing elements. Charged particles $P_7$, $P_8$ and $P_9$ are illustrated as being entrained in the gas stream flowing relative to surfaces 116, 118 and 120 as indicated by arrows 122. As the gas stream narrows to flow between surfaces 116 and 118 particles $P_7$, and $P_8$ are moved toward one another. The mutual repulsion resulting from the fact that the particles have charges of the same polarity tends to separate the particles and force them towards surfaces 116 and 118, whereby removal of the particles from the gas stream by attraction thereof to neutral surfaces 116 and 118 is enhanced. Particle $P_9$ is illustrated as moving outwardly with the portion of the gas stream passing adjacent surface 120. Particle $P_{10}$ is already on packing surface 120 and the mutual repulsion of particles $P_9$ and $P_{10}$, assuming particle $P_{10}$ has not lost its charge, tends to move particle $P_9$ toward liquid droplet 124 and in such close proximity thereto that particle $P_9$ is removed from the gas stream by attraction to neutral droplet 124. Particle $P_{11}$ is illustrated as moving in close proximity to liquid droplet 126 and being attracted thereto and thus removed from the airstream. Droplet 126 already carries a particle $P_{12}$ which is now neutral by having imparted its charge to the liquid droplet. Particle $P_{11}$ is also neutralized by contact with droplet 126. As mentioned hereinabove, the mass of the droplet relative to the particle is such that the charge of a particle imparted to the droplet does not appreciably effect its neutral character, whereby a force of attraction exists between droplet 126 and particle $P_{11}$.

It is to be clearly understood that the foregoing description of particle removal by force of attraction is merely illustrative of the manner in which particulate matter may be removed from a gas stream in accordance with the present invention. Whether a given particle is or is not removed from the gas stream by attraction to a given neutral surface defined by a packing element, apparatus wall or liquid droplet is, of course, dependent on the extent to which the particle is charged, the distance between the charged particle and the surface, and the velocity with which the particle is moving relative to the surface. It will be appreciated too that a given particle may bypass a considerable number of liquid droplets or other surfaces before it passes a surface in sufficiently close proximity for the force of attraction to overcome the velocity of the particle and the drag force of the gas stream thereon and thus remove it from the gas stream. It will be further appreciated that the probability of particle removal by force of attraction is dependent on the number of surfaces available to a given particle in its travel from the inlet to the outlet of the apparatus. The fan means or other means employed to cause gas flow through the scrubbing apparatus is, of course, operated in a manner whereby the gas flow is at a velocity sufficiently low to increase the probability that the forces of attraction will overcome the particle velocity and gas stream drag force. In a cross flow scrubber of the character herein described, the foregoing particle removal preferably is achieved employing a scrubbing liquid flow rate of from approximately 1,000 to 12,000 pounds per hour per square foot of packing measured transverse to the direction of flow, and a gas velocity of from approximately 1 to 10 feet per second.

Particle removal capability in accordance with principles of the present invention is best illustrated by reference to specific test results. In this regard, tests conducted include flowing particle laden gas through a liquid contact zone of scrubbing apparatus of the character described hereinabove, but without any packing in the zone other than that in an unwetted demister zone which prevents mist carryover through the outlet from the contact zone. Particles of 50% dioctylphthalate and 50% kerosene were generated and introduced into the gas stream, and the particles ranged in size from below 0.1 micron. Grain loading at the scrubber outlet was measured by a cascade type Andersen Stack Sampler. The gas flow rate was 2,000 cubic feet per minute and the gas velocity through the contact zone was 7 feet per second. The scrubbing liquid was water and the flow rate thereof downwardly through the contact zone was 4,000 pounds per hour per square foot of the contact zone measured transverse to the direction of water flow. The ionizer voltage was 21 kv and the amperage was 15 ma. Total grain loading with the ionizer de-energized was measured at 0.0085 grains per cubic foot, and with the ionizer energized was measured at 0.0042 grains per cubic foot. Thus, particle removal by scrubbing liquid flow was increased 51% when the ionizer was employed therewith. The results of this test with regard to particle sizes measured is set forth in the following table.

TEST RESULTS IN PARTICLE SIZE RANGES

| Particle Size Range Microns | Inlet Grain Loading in Size Range Grains/Ft.$^3$ | Outlet Grain Loading in Size Range Grains/Ft.$^3$ | Removal Efficiency in Size Ranges % |
| --- | --- | --- | --- |
| 0 – 0.1 | 0.0046 | 0.0023 | 50 |
| 0.1 – 0.3 | 0.0023 | 0.0011 | 52 |
| 0.3 – 1.0 | 0.0005 | 0.0004 | 20 |
| 1.0 – 2.0 | 0.0006 | 0.0002 | 67 |
| 2.0 – 3.3 | 0.0005 | 0.0002 | 60 |
| TOTALS | 0.0085 | 0.0042 | 51 |

The tests conducted further include tests employing the preferred embodiment of apparatus hereinabove described. In this respect, the latter tests were conducted on a horizontal cross flow scrubber having a normal gas flow capacity of 2,000 cubic feet per minute. Particulate generating equipment was devised which enabled the generation of particles of kerosene and particles of a mixture of kerosene and dioctylphthalate, which particles were generated in size ranges including sizes below 0.1 micron. Sampling of cleaned gases flowing through the outlet of the scrubbing apparatus was conducted with a cascade type Andersen Stack Sampler with a Gellman back-up filter with type A glass filter paper (98.7% effective above 0.025 micron). In performing the tests, steady state conditions were established and samples were taken and compared both with the ionizer energized and de-energized. The tests indicate that the level of particulate emission from the outlet of the scrubber when the ionizer is energized is reduced by 70 to 85% from the level when the ionizer is de-energized. The effectiveness of the particle removal is virtually independent of particle size. The results indicate relatively equal effectiveness in ranges of below 0.1 micron, 0.3–1.0 micron, 1.0–2.0 micron, and 2–3.3 microns. As mentioned hereinabove the scrubber normally removes virtually 100% of particulate matter above the latter size. The test results are as follows:

| | TEST A | TEST B |
| --- | --- | --- |
| Particulate Material | Kerosene | 50% Kerosene 50% Dioctyl-Phthalate |
| Total Air Flow | 2000 ft$^3$/min | 2000 ft$^3$/min |
| Air Mass Rate | 1850 lbs/Hr.ft$^2$ | 1850 lbs/Hr.ft$^2$ |
| Type Packing | 1 In. Nominal Size "TELLERETTES" | 1 In. Nominal Size "TELLERETTES" |
| Depth of Packing in Direction of Air Flow | 24 In. | 24 In. |
| Air Velocity through Ionizer & Scrubber | 7 ft/sec | 7 ft/sec |
| Scrubber Water Rate | 4000 lbs/Hr.ft$^2$ | 4000 lbs/Hr.ft$^2$ |
| Scrubber Outlet Particulate loading without Charged Particle Effect | 0.035 Grains/ft$^3$ | 0.34 Grains/ft$^3$ |
| Scrubber Outlet Particulate Loading with Charged Particle Effect | 0.0056 Grains/ft$^3$ | 0.005 Grains/ft$^3$ |
| % Reduction of Emission by use of Charged Particle Effect | 84% | 85% |
| % Reduction of Emission by use of Charged Particle Effect for Particle Size Range: | | |
| 2.0 – 3.3 Microns | 80% | (Particles not generated in these sizes |
| 1.0 – 2.0 Microns | 92% | |
| 0.3 – 1.0 Microns | 74% | 71% |
| 0.1 – 0.3 Microns | 77% | 92% |
| Below .1 (Not Measured) | 87% | |

In addition to the above tests, tests were conducted with respect to particle removal from gases exhausted from an aluminum reduction facility employing "Soderberg" type pots. Particulate matter in the exhaust gases included alumina, cryolite, carbon, and hydrocarbons in the form of tars. The gases were precleaned by passage through spray towers to remove large particulate matter and were then passed through a packed wet scrubber of the character herein described. The gas was flowed through a bed of 1 inch nominal size "TELLERETTES" having a depth of two feet in the direction of gas flow. The gas velocity was 4 feet per second through the ionizer and scrubber and the total gas flow was 1,100 cubic feet per minute. The gas mass flow rate was 1,050 pounds per hour per square foot. Water was employed as the scrubbing liquid and the water flow rate was 4,000 pounds per hour per square foot. The ionizer unit has a wire to rod spacing of 2 inches and the ionizer voltage was 34 kv. The ionizer amperage was 6.2 ma. Sampling was made using a cascade type Andersen Stack Sampler. Particulate in the gas stream was measured to be 89% below 5.5 microns in size. In the size range below 5.5 microns the inlet grain loading was 0.0267 grains per cubic foot and the outlet grain loading was 0.0040 grains per cubic foot. The efficiency of particulate removal below 5.5 microns was approximately 85%. The following table indicates the test results for the various particle sizes measured.

TEST RESULTS IN PARTICLE SIZE RANGES

| Particle Size Range Microns | Inlet Grain Loading in Size Range Grains/Ft.³ | Outlet Grain Loading in Size Range Grains/Ft.³ | Removal Efficiency in Size Ranges % |
|---|---|---|---|
| 0 – 0.1 | .0051 | .0017 | 67 |
| 0.1 – 0.3 | .0063 | .0011 | 83 |
| 0.3 – 1.0 | .0054 | .0007 | 87 |
| 1.0 – 2.0 | .0067 | .0005 | 92 |
| 2.0 – 3.3 | .0022 | .0000 | 100 |
| 3.3 – 5.5 | .0010 | .0000 | 100 |
| TOTALS | .0267 | .0040 | 85% |

The results of the foregoing test will be best appreciated when compared to the results of a basic efficiency test conducted without the ionizer. In the basic efficiency test, the total gas flow rate was 2,077 cubic feet per minute and the gas velocity was 6.7 feet per second. The packing was comprised of a bed of 1 inch "TELLERETTES" having a depth of 4 feet in the direction of gas flow. Water was employed as the scrubbing liquid and the water flow rate was 4,000 pounds per hour per square foot. Sampling was achieved using a cascade type Andersen Stack Sampler. Total inlet grain loading was measured at 0.011 grains per cubic foot and total outlet grain load was measured at 0.009 grains per cubic foot. The overall efficiency was approximately 10.2%.

Although considerable emphasis has been placed herein on the fact that the scrubbing apparatus described is of the character wherein the contact zone is filled with a porous mass defined by randomly oriented packing elements, it is to be clearly understood that the invention is equally applicable to low energy scrubbing devices wherein the contact zone includes static surface means other than packing elements. For example, the scrubbing device might well include surface means defined only by wall surfaces surrounding the contact zone, or surface means defined by splash plates, baffles, trickle plates, or the like. Further, in a packed scrubber, a porous mass might be defined by means other than individual packing elements and in this respect could be defined by a unitary mass of filament strands, or the like. Moreover, it will be appreciated that where the porous mass is defined by packing elements, the packing elements may be of a form other than the particular packing elements herein described. For example, the packing might be defined by spheres, stacked packing pieces, modular type corrugated packing, saddle elements, or ring elements. It will be appreciated too that while it is preferred to maintain the collecting surfaces absolutely neutral, such as by grounding, to achieve particle collection by attraction forces, a negligible charge of the same or opposite polarity from the particle charge could be imposed in some manner on the surfaces without departing from the attraction force principles of the present invention. Further, it will be understood that gas flow through the scrubbing apparatus and the flow of scrubbing liquid therethrough may be cocurrent, counter-current, or cross flow. It will be appreciated too that two or more stages of the apparatus described herein may be employed to obtain higher removal efficiency. Still further, it will be appreciated that where packing is employed the volume of packing will vary with the size of the contact zone, and that the depth of packing in the direction of gas flow can be varied in order to arrive at a depth which provides the most desirable results for a given situation. Increased volume and depth, of course, increases the number of surfaces available and accordingly, increases the probability of particle removal by the attraction force principle. With regard to the number of surfaces available when torous-like ring packing elements of the character described herein are employed, it will be apparent that the number of surfaces is for all practical purposes indeterminable when considering the fact that approximately 1,000, 1 inch nominal size packing elements, randomly oriented, are required to fill 1 cubic foot in the contact zone.

As many possible changes may be made in the present invention and as many possible changes may be made in the embodiment herein set forth, it is to be distinctly understood that the foregoing description is to be interpreted merely as illustrative of the present invention and not as a limitation.

We claim:

1. Apparatus for removing particulate matter from a gas stream comprising: a housing having inlet and outlet ends and wall means defining a horizontal gas flow path between said ends, said housing being of generally uniform cross-sectional dimension between said ends, horizontally spaced apart grid means in said housing between said ends and defining a contact chamber with said wall means, said contact chamber containing only randomly oriented packing elements of dielectric material, said elements together occupying the space between said wall means and grid means and defining a porous mass having a horizontal top surface, irrigating liquid discharge means in said housing overlying said top surface for distributing irrigating liquid across said surface for flow by gravity downwardly through said contact chamber and through and in contact with said packing elements, a sump beneath said contact chamber to receive irrigating liquid flowing through said contact chamber, a pump for recirculating irrigating liquid from said sump to said discharge means, a plurality of generally parallel electrodes in said housing providing a particle charging section between said inlet end and said contact chamber, said electrodes being spaced apart transverse to the direction of gas flow through said housing, first alternate ones of said electrodes being wires connected to a source of direct current and second alternate ones of said electrodes being connected to ground, means to flow liquid onto said electrodes to clean the electrodes, means electrically grounding said housing to maintain said irrigating liquid and packing elements electrically neutral, and means causing said gas to flow past said electrodes and thence through said contact chamber transverse to the direction of irrigating liquid flow therethrough.

2. Apparatus according to claim 1, and second liquid distribution means between said electrodes and the adjacent one of said grid means for directing liquid onto said adjacent grid means, and conduit means connecting said second liquid distribution means with said sump and said pump for said pump to circulate liquid from said sump to said second distribution means.

3. Apparatus for removing particulate matter from a gas stream comprising, a generally horizontal housing open at its opposite ends and having top, bottom and sidewalls between said opposite ends, grid means within said housing and horizontally spaced apart between said opposite ends, said top, bottom and sidewalls and said grid means together defining a contact chamber in said housing, a gas inlet duct at one of said opposite ends, a gas outlet duct at the other of said opposite ends, randomly oriented packing elements substantially filling said contact chamber, each of said packing elements being generally toroidal and defined by filamentous dielectric material, said packing elements in said contact chamber together providing a porous mass having a top surface spaced beneath said top wall, baffle plates extending between said sidewalls and between said top wall and said top surface of said packing elements to restrain gas flow across said contact chamber in the space between said top wall and top surface, irrigating liquid conduit means including a plurality of liquid outlets between said baffle plates and overlying said top surface of said packing elements for distributing irrigating liquid across said surface for flow by gravity downwardly through said contact chamber and through and in contact with said packing elements, said irrigating liquid conduit means further including liquid outlets for directing liquid onto the one of said grid means facing said inlet duct, a sump beneath said bottom wall and in liquid flow communication with said contact chamber to receive irrigating liquid flowing downwardly through said contact chamber, a pump for pumping irrigating liquid in said sump to said conduit means, a plurality of generally parallel electrodes in said inlet duct, first alternate ones of said electrodes being wires connected to a source of direct current and second alternate ones of said electrodes being connected to ground, said wires being in a common plane extending transversely across said inlet duct, means to flow liquid on said electrodes to clean the electrodes, means electrically grounding said housing to maintain said irrigating liquid and packing elements electrically neutral, said pump and irrigating liquid outlets providing for liquid flow downwardly through said packing elements at a rate of from 1,000 to 12,000 pounds per hour per square foot of the area of said top surface of said porous mass, and means causing said stream of gas to flow past said electrodes and thence across said contact chamber transverse to said direction of liquid flow and at a velocity of from 1 to 10 feet per second, whereby particles in said gas stream are electrically charged in passing said electrodes and charged particles are removed from said gas stream by attraction to said neutral irrigating liquid and packing elements when said charged particles approach said neutral liquid and packing elements in such close proximity thereto that the force of attraction therebetween overcomes the velocity of a particle and the drag force of said air stream thereon.

\* \* \* \* \*